(12) United States Patent
Wein et al.

(10) Patent No.: US 9,505,009 B1
(45) Date of Patent: Nov. 29, 2016

(54) STORAGE, GRINDER AND DOSAGE DISPENSING DEVICE

(71) Applicants: Michael Wein, Houston, TX (US); Munear Ashton Kouzbari, Dallas, TX (US); Stephen Douglas Alexander, Houston, TX (US)

(72) Inventors: Michael Wein, Houston, TX (US); Munear Ashton Kouzbari, Dallas, TX (US); Stephen Douglas Alexander, Houston, TX (US)

( * ) Notice: Subject to any disclaimer, the term of this patent is extended or adjusted under 35 U.S.C. 154(b) by 0 days.

(21) Appl. No.: 14/799,501

(22) Filed: Jul. 14, 2015

(51) Int. Cl.
  *B02C 18/08* (2006.01)
  *B02C 18/18* (2006.01)
  *B02C 23/10* (2006.01)
  *A47J 42/14* (2006.01)

(52) U.S. Cl.
  CPC ............ *B02C 18/186* (2013.01); *A47J 42/14* (2013.01); *B02C 18/08* (2013.01); *B02C 23/10* (2013.01); *B02C 2018/188* (2013.01)

(58) Field of Classification Search
  CPC . B02C 19/0075; B02C 18/186; B02C 23/10; B02C 18/08; B02C 2018/188; A47J 42/34; A47J 42/14
  USPC ............ 241/DIG. 27, 168, 169, 169.1, 273.3
  See application file for complete search history.

(56) References Cited

U.S. PATENT DOCUMENTS

| 2,022,151 | A | * | 11/1935 | Riddle | A47J 43/25 241/250 |
| 2,707,552 | A | * | 5/1955 | Matthiesen | B65D 83/0481 206/37 |
| 2,759,598 | A | * | 8/1956 | Tregilgas | B65D 83/0481 206/537 |
| 7,367,519 | B2 | * | 5/2008 | de Groote | A47J 19/04 241/168 |
| 7,422,170 | B2 | * | 9/2008 | Bao | B02C 18/24 241/168 |
| 8,083,167 | B1 | * | 12/2011 | Namakian | 241/169.1 |
| 8,393,563 | B2 | | 3/2013 | Chaoui et al. | |
| 2009/0134256 | A1 | * | 5/2009 | Rice | A47J 42/08 241/169.1 |
| 2009/0212142 | A1 | * | 8/2009 | Greiner | A47J 43/255 241/93 |
| 2009/0256016 | A1 | * | 10/2009 | Lauzet | A47J 42/18 241/169.1 |
| 2010/0142329 | A1 | * | 6/2010 | Newman | A61J 7/0409 368/10 |
| 2012/0006922 | A1 | * | 1/2012 | Wilson | A47J 42/10 241/169.1 |
| 2012/0097774 | A1 | * | 4/2012 | Hainbach | A47J 42/14 241/101.2 |
| 2012/0168544 | A1 | * | 7/2012 | Chaoui | B02C 18/08 241/68 |
| 2013/0214068 | A1 | * | 8/2013 | Camitta | B02C 18/16 241/25 |
| 2014/0261471 | A1 | * | 9/2014 | Ruzycky | A24C 5/02 131/108 |

\* cited by examiner

*Primary Examiner* — Onekki Jolly
(74) *Attorney, Agent, or Firm* — Buskop Law Group, PC; Wendy Buskop (57) ABSTRACT

A storage, grinder and dosage dispensing device having a top cap body, a middle section body and a bottom cup. The middle section body rotatably engages the top cap body beneath the plurality of downwardly protruding top grinding knives. The bottom cup removably attaches to the top cap body or the middle section body forming an airtight storage chamber. The storage, grinder and dosage dispensing device is configured to simultaneously grind and tear material inserted into the top cap body by the plurality of downwardly protruding top grinding knives and a plurality of grinding teeth in an upper section of the middle section body as the top cap body is rotated on the middle section body creating ground material, which is then passed through a plurality of holes to a middle section chamber.

13 Claims, 7 Drawing Sheets

STORAGE, GRINDER AND DOSAGE DISPENSING DEVICE

FIELD

The present embodiments generally relate to a medicinal grinder capable of dispensing dosage amounts of ground herbal material.

BACKGROUND

A need exists for an easy to use grinder for medicinal dosage amounts.

A further need exists for a lightweight device which can measure multiple dosage amounts for a user.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a storage, grinder and dosage dispensing device.

The embodiments further relate to a medicinal grinder capable of dispensing dosage amounts of ground herbal material.

A top cap body can have a plurality of downwardly protruding top grinding knives from the top cap body.

A middle section body can be attached to the top cap body surrounding the plurality of downwardly protruding top grinding knives.

The middle section body can have a plurality of grinding teeth protruding upward from a middle section body and a plurality of holes adjacent the plurality of grinding teeth.

In embodiments, the plurality of grinding teeth can be rectangular, square, diamond shaped, and tapered to a point. In embodiments, the plurality of grinding teeth can be serrated.

The plurality of grinding teeth can have a density from 5 per inch to 50 per inch. For example, for a 3 inch diameter, 21 teeth can be used using a combination of cone shaped teeth and diamond shaped teeth.

The plurality of grinding teeth can have a height from 10 percent to 100 percent of the height of the middle section chamber, such as from 2 millimeters to 3 centimeters.

In embodiments, the grinder can have components that are dishwasher safe.

In embodiments, the middle section body can be removably attached to the upper section forming a middle section chamber.

A measuring means can be formed in the middle section body to measure dosage amounts of ground material, which can be ground sequentially in the top cap body and then in the middle section body.

A bottom cup can be removably attached to the middle section body, forming an airtight storage chamber.

In embodiments, the entire invention can be an injection molded device.

Figure 1:
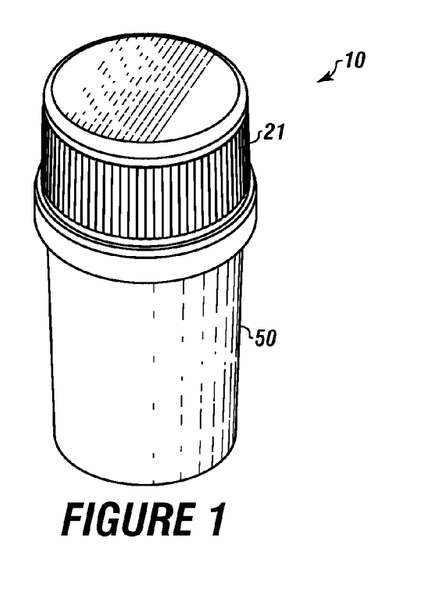
FIG. 1 is an assembled view of the storage, grinder and dosage dispensing device according to one or more embodiments.

Turning now to the Figures, FIG. 1 shows a storage, grinder and dosage dispensing device according to one or more embodiments.

The storage, grinder and dosage dispensing device 10 can have a top cap body 21 and a bottom cup 50.

The top cap body 21 can be rotatable and the bottom cup 50 can be removably attached to the top cap body 21.

In embodiments, the top cap body 21 can have a child safe connection with an airtight seal engaging the bottom cup 50.

Figure 2:
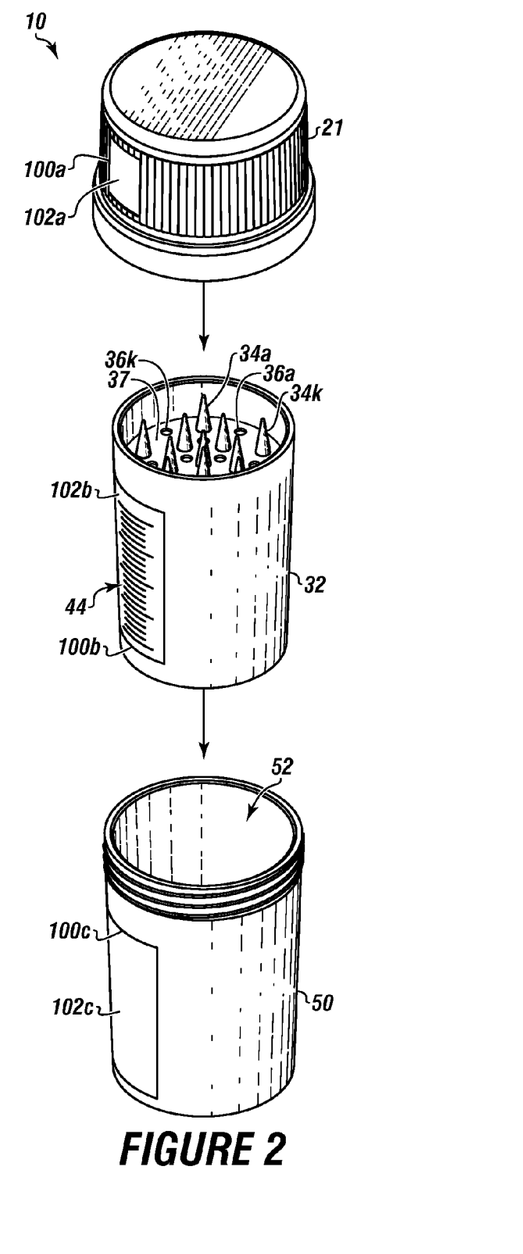
FIG. 2 is an exploded view of the storage, grinder and dosage dispensing device according to one or more embodiments.

FIG. 2 is an exploded view of the storage, grinder and dosage dispensing device according to one or more embodiments.

The storage, grinder, and dosage dispensing device 10 is shown with the top cap body 21, wherein the top cap body can have an opening 100a, which can be covered by a clear transparent flexible film 102a.

The clear transparent flexible film 102a can be a clear plastic or a PLEXIGLASS® type material with a width from 1 mm to 3 mm, a length from 1 mm to 3 mm and a thickness from 0.1 mm to 0.5 mm and all the numbers in between.

The top cap body 21 can have a height from 0.5 cm to 15 cm and any number in between.

A middle section body 32 is shown, which can be rotatable within the top cap body 21.

The middle section body 32 can have a plurality of grinding teeth 34a-34k, which can protrude upwardly from a filter 37, wherein the filter can be contained in the middle section body 32.

In embodiments, the plurality of grinding teeth 34a-34k can be conical in shape, rectangular in shape or triangular in shape. In embodiments, the plurality of grinding teeth 34a-34k can have serrated edges.

The plurality of grinding teeth 34a-34k can extend from 10 percent to 100 percent of the height of the middle section body 32.

The middle section body 32 can have a plurality of holes 36a-36k which can be formed adjacent the plurality of grinding teeth 34a-34k.

In embodiments, the middle section body 32 can be divided into two portions using the filter 37, which can be horizontal across the middle section body 32 rather than along a longitudinal axis.

In embodiments, the filter 37 can divide the chamber of the middle section body 32 into multiple portions.

In embodiments, the filter 37 can support the plurality of grinding teeth 34a-34k. In embodiments, the filter 37 can contain the plurality of holes 36a-36k.

In embodiments, the filter 37 can be a wire mesh filter with the plurality of holes 36a-36k, which can be formed by the intersecting wire strands.

In embodiments, the filter 37 can be a plate with holes.

In embodiments, the plurality of holes 36a-36k can have the same density as the plurality of grinding teeth 34a-34k. In embodiments, the plurality of holes 36a-36k can have a different density as the plurality of grinding teeth 34a-34k In embodiments, the ratio of holes to grinding teeth can range from 0.5:1 to 1:5 to 5:0.5.

In embodiments, the plurality of holes can have hole diameters in the filter that can range from 2 mm to 1.5 cm per hole.

In embodiments, the middle section body 32 can have a measuring means 44, which in this Figure, are shown as a series of graduated lines. The graduated lines can measure from 0.5 grams to 9070 grams. In other embodiments, the graduated lines can be shown in ounces, such as $1/8^{th}$ ounce, $1/4$ ounce, and $3/8^{th}$ ounce.

In embodiments, the measuring means can be configured to measure dosage amounts as the dosage material falls from the top cap body 21 and then drops into the middle section body 32.

In embodiments, the middle section body can have an opening 100b, which can be covered by a clear transparent flexible film 102b on which the measuring means 44 can be located. The size of the opening 100b and the clear transparent flexible film 102b can be identical to the opening 100a and the clear transparent flexible film 102a located on the top cap body.

The middle section body 32 can have a height from 1 cm to 100 cm, and any number in between.

The bottom cup 50 is also shown, which can be removably attached to the middle section body 32, forming an airtight storage chamber 52.

In an embodiment, a thermoplastic seal can be used as an airtight seal and can seal between the middle section body 32 and the bottom cup 50. It should be noted that the air tight seal can be formed by the child safe connection with an airtight seal in the top cap body 21.

In embodiments, the bottom cup 50 can have an opening 100c, which can be covered by a clear transparent flexible film 102c.

The bottom cup 50 can have a height from 1 cm to 100 cm, and any number in between.

The openings 100a, 100b, and 100c can range in size from 5 millimeters in width to 5 millimeters in height and up to 30 centimeters by 30 centimeters, and any number in between.

Each clear transparent flexible film 102a, 102b, and 102c can provide a visual portal to the contents within the storage, grinder and dosage dispensing device 10.

The clear transparent flexible films 102a, 102b, and 102c can have a thickness ranging from 0.3 millimeter to 5 millimeters and any number in between.

The clear transparent flexible films 102a, 102b, and 102c can be made from a crystalline polymer, such as a polyethylene, polypropylene or another clear plastic.

The assembled storage, grinder and dosage dispensing device 10 can have a height ranging from 2.5 cm to 215 cm.

In embodiments, the storage, grinder and dosage dispensing device 10 can be formed from a biodegradable plastic which can degrade in less than 3 years in a landfill.

Figure 3A:
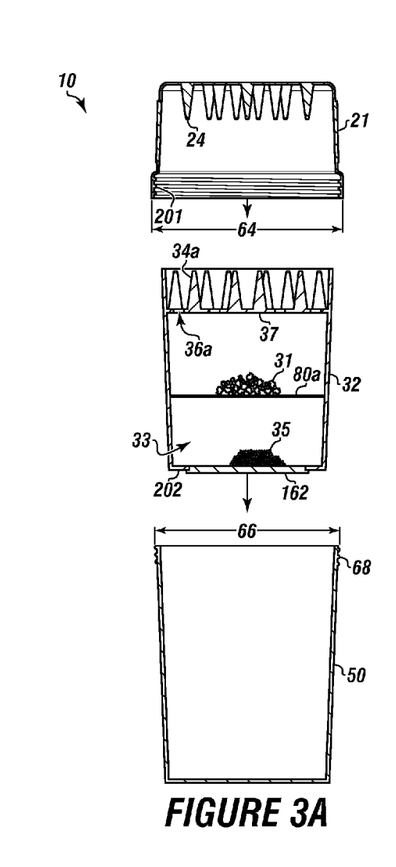
FIGS. 3A-3C show a staged connection of the storage, grinder and dosage device according to one or more embodiments.
Figure 3B:
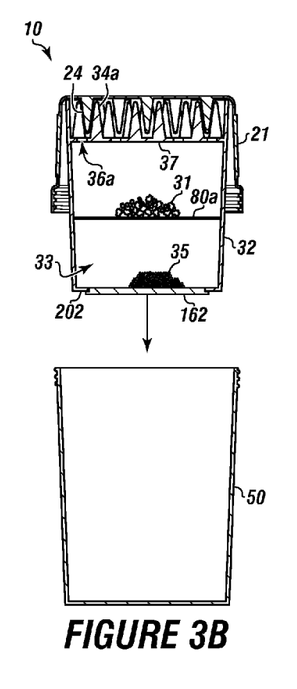
Figure 3C:
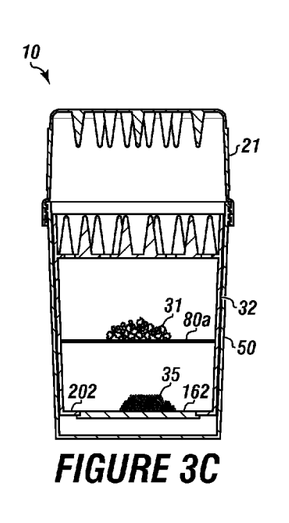

FIGS. 3A-3C show the storage, grinder and dosage dispensing device according to one or more embodiments.

FIG. 3A shows an exploded view of the storage, grinder and dosage dispensing device 10 with the top cap body 21 having a plurality of downwardly protruding top grinding knives 24, which are depicted as protruding downwardly from the top cap body 21.

The plurality of downwardly protruding top grinding knives 24 can extend from 5 percent to 95 percent into the top cap body 21. In embodiments, the plurality of downwardly protruding top grinding knives 24 can be rectangular or conical in shape.

In embodiments, the plurality of downwardly protruding top grinding knives 24 can have a serrated edge on a portion of at least one grinding knife.

The top cap body 21 can have cap threads 201, which can be formed on the outer surface of the top cap body 21.

The top cap body 21 is shown with a top cap body outer diameter 64, which can range from 5 cm to 30 cm.

The middle section body 32 can removably slide against the top cap body 21 beneath the plurality of downwardly protruding top grinding knives 24.

The plurality of grinding teeth are shown extending upwardly from the filter 37. upwardly extending.

The filter 37 can separate an upper portion from a lower portion of the middle section body 32.

In embodiments, the plurality of holes 36a can comprise of at least one hole formed adjacent each of the plurality of grinding teeth 34a allowing ground material 31 to drop into a middle section chamber 33 formed between the plurality grinding teeth 34 and a bottom 202 of the middle section body 32.

Ground material 31 can rest on a screen 80a. Screen 80a, which can allow particulate 35 to pass through the screen 80a into the middle section chamber 33.

A closable port 162 in the bottom 202 or in a side wall of the middle section body 32 can allow release of a defined dosage amount of ground material 31 from the middle section chamber 33 into the bottom cup 50.

In embodiments, a lower threaded engagement 68 can be formed on an outer surface of the bottom cup 50, which can engage cap threads 201 of the top cap body 21.

The bottom cup 50 can have a bottom cup diameter 66. The bottom cup diameter 66 can be less than the top cap body outer diameter 64 of the top cap body 21 to enable engagement of the bottom cup 50 with the top cap body 21.

FIG. 3B shows a partially assembled view and a partially exploded view of the storage, grinder and dosage dispensing device with the elements from FIG. 3A.

The storage, grinder and dosage dispensing device 10 is shown with the top cap body 21 rotatably positioned over the middle body section 32 which contains the ground material 31 and the particulate 35.

Rotating the middle section body 32 enables grinding of material between the plurality of downwardly protruding top grinding knives 24 adjacent the plurality of grinding teeth 34a.

The filter 37 is shown with the plurality of holes 36a, wherein the plurality of holes 36 can be configured to enable the ground material 31 to fall into the middle section chamber 33 of the middle section body 32 onto the screen 80a. The middle section body 32 has a bottom 202, which can receive the particulate 35 from the screen 80a and the closable port 162 enabling removal of the particulate 35.

The bottom cup 50 is shown detached from the top cap body 21.

FIG. 3C shows an assembled view of the storage, grinder and dosage dispensing device with the elements from FIG. 3A.

The storage, grinder and dosage dispensing device 10 is shown with the top cap body 21 fitted to the bottom cup 50 containing the middle section body 32.

The ground material 31 is shown supported by the screen 80a in the middle body section 32, which is shown within the bottom cup 50.

The particulate 35 is shown supported by the bottom 202 and the closable port of the middle body section 32.

FIGS. 4A-4D show a four part version of the storage, grinder and dosage dispensing device according to one or more embodiments.

Figure 4A:
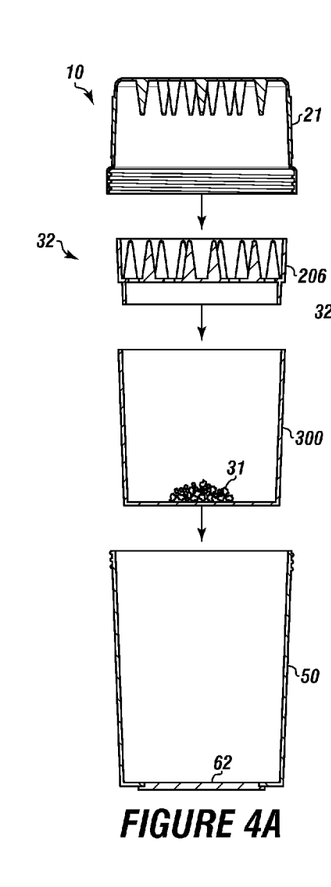
FIGS. 4A-4D show a four part version of the storage, grinder and dosage dispensing device according to one or more embodiments.
Figure 4B:
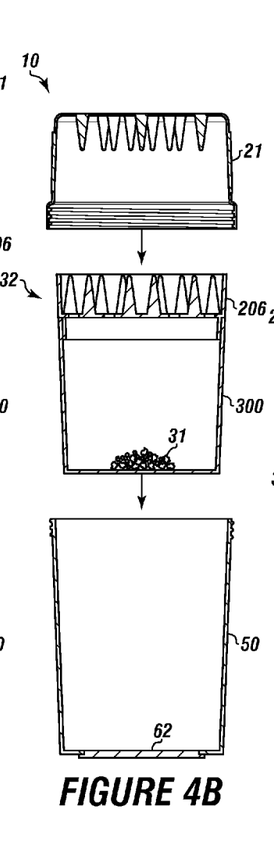
Figure 4C:
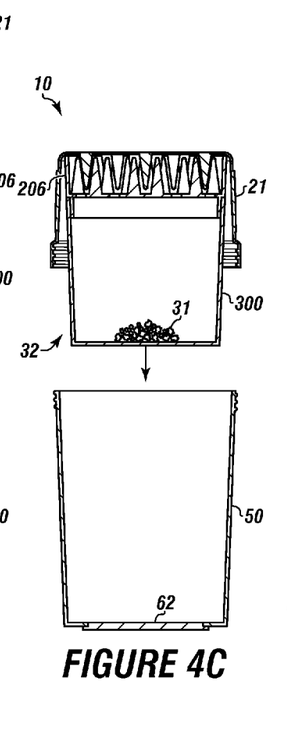
Figure 4D:
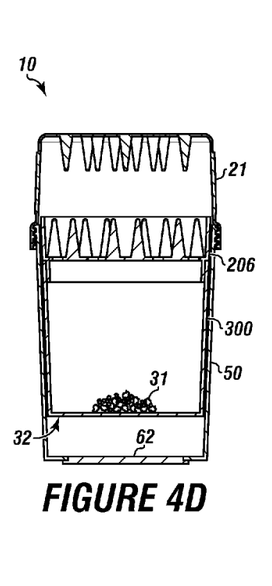

FIG. 4A shown as an exploded view of a four part version of the storage, grinder and dosage device. FIG. 4B shows the assembled middle section body with the top cap body detached and the bottom cup. FIG. 4C shows the top cap body sliding over the middle section body. FIG. 4D shows the assembled four part version of the storage, grinder and dosage dispensing device.

The storage, grinder and dosage dispending device 10 is depicted with the top cap body 21, the middle body section 32, the bottom cup 50, and the closable port 62.

In embodiments, the middle body section 32 can be formed into two components, an upper section 206 and a container 300.

The container 300 is secured beneath the plurality of grinding teeth 34 of the middle section body 32 which are in the upper section 206.

The container 300 can force fit to the upper section 206 of the middle section body 32.

The container 300 can contain the ground material 31.

In embodiments, the storage, grinder and dosage dispensing device can hold 10 pounds of material for grinding, storage and dispensing.

Figure 5A:
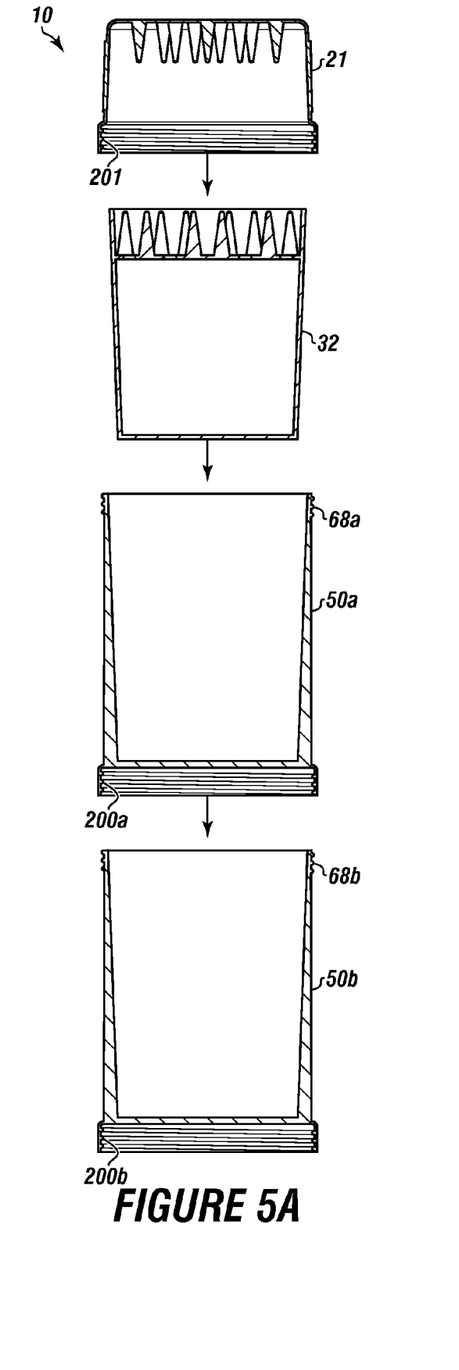
FIGS. 5A and 5B show a dual bottom cup version of the storage, grinder and dosage dispensing device according to one or more embodiments.
Figure 5B:
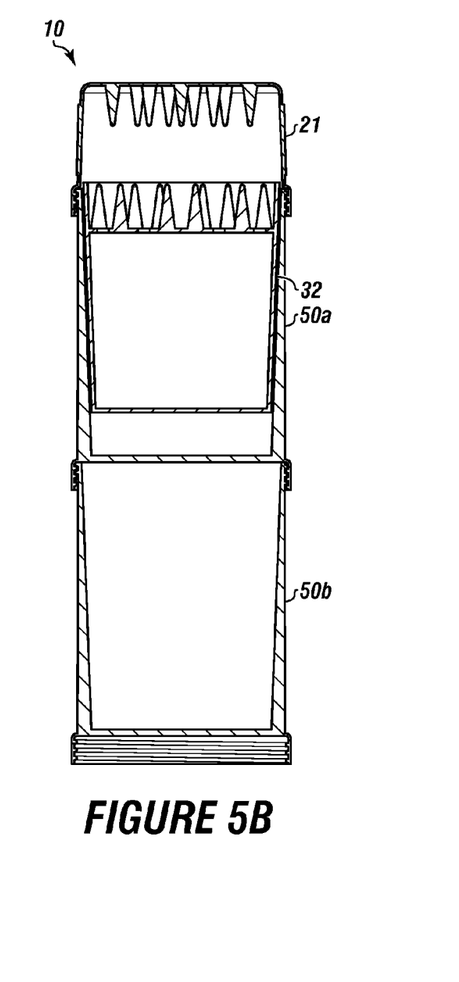

FIGS. 5A and 5B show a dual bottom cup version of the storage, grinder and dosage dispensing device according to one or more embodiments.

FIG. 5A is an exploded view of the of the storage, grinder and dosage dispensing device 10 showing the top cap body 21, the middle section body 32, the bottom cup 50a and an additional bottom cup 50b secured to bottom cup 50a.

In this embodiment, the bottom cup 50a threads or fastens to the additional bottom cup 50b.

The top cap body 21 of the storage, grinder and dosage dispensing device 10 can attach to bottom cup 50a using cap threads 201 that can engage a lower threaded engagement 68a of the bottom cup 50a.

The middle section body 32 is shown contained between the top cap body 21 and the bottom cup 50a.

Bottom cup threads 200a on bottom cup 50a can engage an additional lower threaded engagement 68b on the additional bottom cup 50b.

In embodiments, the additional bottom cup 50b can have additional bottom cup threads 200b, which can engage additional threadable accessories.

FIG. 5B is an assembled view of FIG. 5A of the storage, grinder and dosage dispensing device 10 showing the top cap body 21, the middle section body 32, the bottom cup 50a and the additional bottom cup 50b secured to bottom cup 50a.

Figure 6:
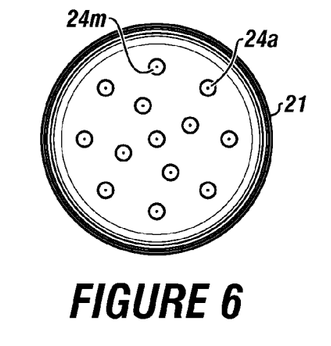
FIG. 6 is a bottom view of the top cap body according to one or more embodiments.

FIG. 6 is a bottom view of the top cap body 21 with the plurality of downwardly protruding top grinding knives 24a-24m.

Figure 7:
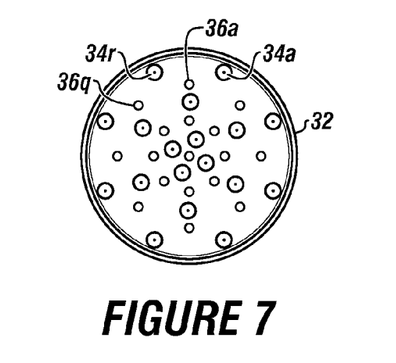
FIG. 7 is a top view of the middle section body according to one or more embodiments.

FIG. 7 is a top view of the middle section body 32 with the plurality of grinding teeth 34a-34r protruding upward and the plurality of holes 36a-36q.

It should be noted that in embodiments, the plurality of grinding teeth can be identical to the plurality of downwardly protruding grinding knives and offset from each other such that the plurality of grinding teeth never actually touch the plurality of downwardly protruding top grinding knives.

In embodiments, the storage, grinder and dosage dispensing device 10 can have transparent walls for each section of the device that is the top cap body 21, the middle section body 32 and the bottom cup 50 can all be transparent, or various sections can be transparent while the others are not.

Figure 8:
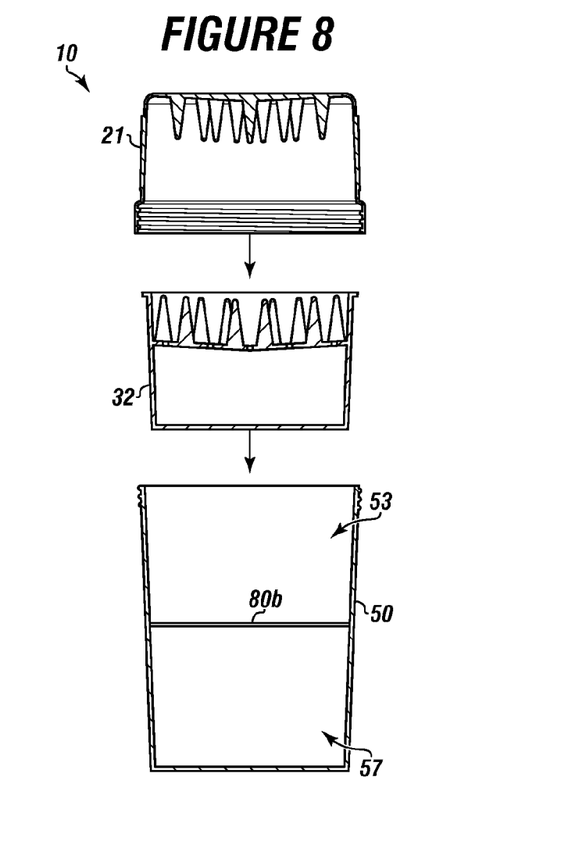
FIG. 8 is an exploded view of the storage, grinder and dosage dispensing device according to one or more embodiments.

FIG. 8 is an exploded view of the storage, grinder and dosage dispensing device according to one or more embodiments.

The storage, grinder and dosage dispensing device 10 with the top cap body 21, the middle section body 32 and a bifurcated bottom cup 50 having an upper cup portion 53 and a lower cup portion 57 divided by a screen 80b is shown.

Figure 9:
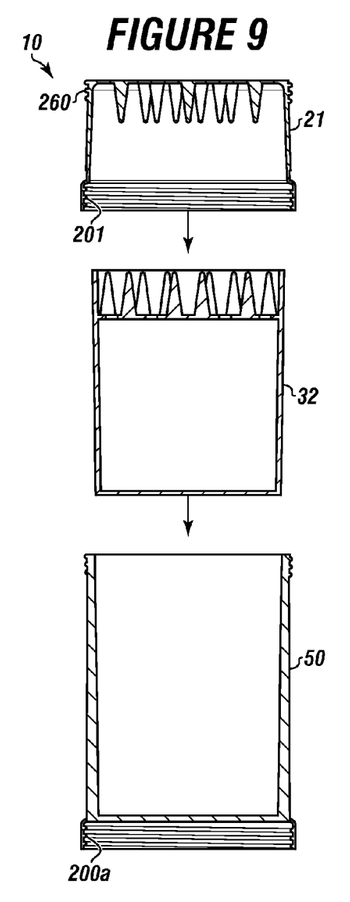
FIG. 9 is an exploded view of the storage, grinder and dosage dispensing device according to one or more embodiments.

FIG. 9 is an exploded view of the storage, grinder and dosage dispensing device according to one or more embodiments.

The storage, grinder and dosage dispensing device 10 is shown with the top cap body 21 having outer threads 260 on the top cap body 21 to threadably engage additional bottom cups 50b or to threadably engage threadable accessories to the top cap body 21.

The bottom cup 50 cab slide around the middle body section 32 and can be secured to cap threads 201.

Bottom cup threads 200a on the bottom cup 50 can engage threads on either an additional bottom cup or a threadable accessory.

Figure 10:
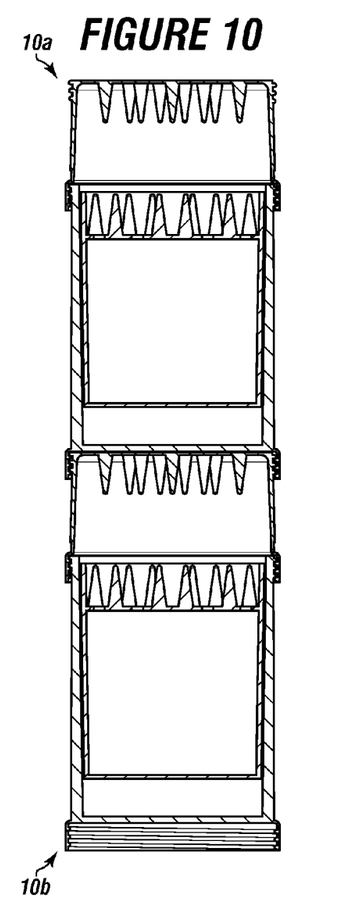
FIG. 10 is an assembled view of two storage, grinder and dosage dispensing devices according to one or more embodiments.

FIG. 10 is an assembled view of the storage, grinder and dosage dispensing device according to one or more embodiments.

In this embodiment, two storage, grinder and dosage dispensing devices 10a and 10b are shown connected together.

Figure 11:
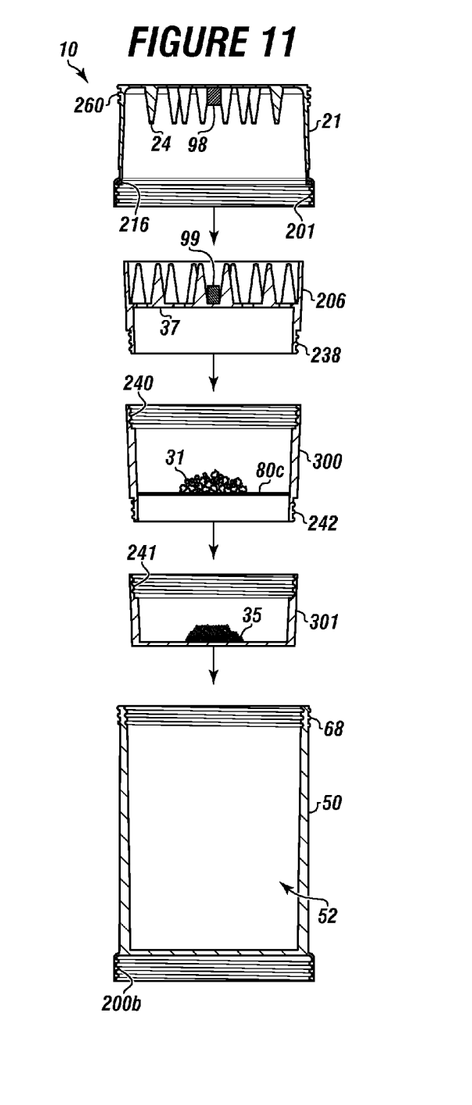
FIG. 11 shows a magnetic version of the storage, grinder and dosage dispensing device according to one or more embodiments.

FIG. 11 shows a magnetic version of the storage, grinder and dosage dispensing device according to one or more embodiments.

In this embodiments, the storage, grinder and dosage dispensing device 10 can have at least one top cap magnet 98 mounted in between the plurality of downwardly protruding top grinding knives 24.

Outer cup threads 260 on the top cap body 21 can secure additional bottom cups or threadable accessories to the top cap body 21.

A child safe connection with an airtight seal 216 is shown on the top cap body 21 mounted adjacent cap threads 201.

The child safe connection with an air tight seal 216 can connect between the top cap body 21 and the bottom cup 50. Other types of seal material can be used to create the child safe connection with an air tight seal 216, such as a plastic to plastic seal, a plastic to metal seal, a metal to metal seal, an o-ring, a thermoplastic o-ring, and combinations thereof.

In embodiments, the child safe connection with an air tight seal 216 can be cleaned easily, such as with soap and water.

The upper section 206 can rotatably engage top cap body 21 beneath the plurality of downwardly protruding top grinding knives 24.

The upper section 206 can have at least one upper section magnet 99 for magnetically coupling to the top cap magnet 98.

It should be noted that the plurality of grinding teeth can protrude upward from the filter 37 and the at least one upper section magnet 99 can be nested among the plurality of grinding teeth.

Upper section inner threads 238 can be formed on an inner surface of the upper section 206 enabling a threadable engagement with the container 300.

In embodiments, the filter 37 can be a ferromagnetic material.

The container 300 can have upper section outer threads 240 for engaging the upper section inner threads 238.

The container 300 can have lower inner threads 242.

A screen 80c can be formed across the container 300 between the upper section outer threads 240 and lower section inner threads 242. The screen 80c can be configured to filter the ground material 31 allowing the particulate 35 to fall through the screen 80c.

The bottom cup 50 can be removably attached to the container 300 using the lower threaded engagement 68 that can engage the lower section inner threads 242. The bottom cup 50 forms the airtight storage chamber 52.

The bottom cup is shown having additional bottom cup threads 200b.

The storage, grinder and dosage dispensing device 10 can be configured to simultaneously grind and tear material inserted into the top cap body 21 by rotating the middle section body 32 while the middle section body 32 is magnetically connected to the top cap body 21 allowing the ground material 31 to pass through the plurality of holes in the upper section 206 to the screen 80c. The screen 80c can be configured to pass the particulate 35 into a tray 301 inside the container 300 surrounded by the bottom cup 50.

The tray 301 can be attached using tray threads 241.

Figure 12:
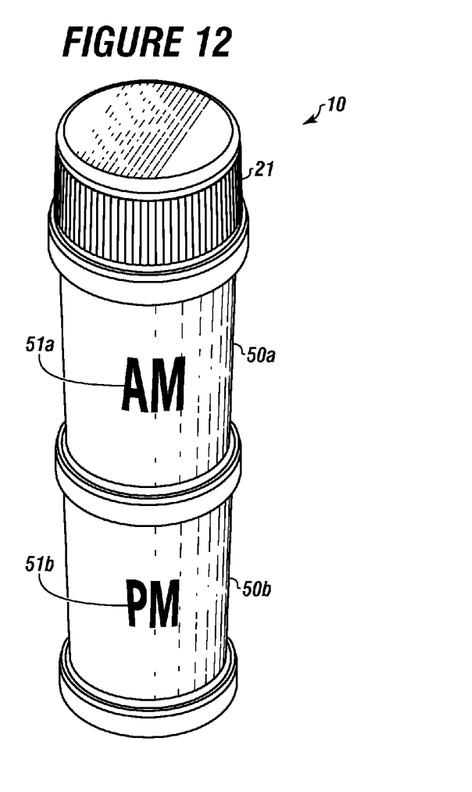
FIG. 12 shows an assembled version of the storage, grinder, and dosage dispensing device with time of day indicators for taking medicine on each of two bottom cups according to one or more embodiments.

FIG. 12 shows an assembled version of the storage, grinder, and dosage dispensing device with time of day indicators for taking medicine on each of two bottom cups according to one or more embodiments.

The storage, grinder and dosage dispensing device 10 is shown with a bottom cup 50a having a label 51a to indicate either a day of the week to identify daily dosage amounts or a time of day. Label 51a, depicts "AM" dosage for the bottom cup 50a and an additional label 51b depicting "PM" dosage for the additional bottom cup 50b. The additional bottom cup 50b is shown threaded in to the bottom cup 50a and bottom cup 50a is shown connected to the top cap body 21. In embodiments, the bottom cup and the additional bottom up can contain a dosage amount, wherein each dosage amount can be the same or different depending upon application.

In embodiments, the storage, grinder and dosage dispensing device can have additional bottom cups, which can be configured to store money, store reusable or disposable dosage delivery systems, such as rolling papers, matches, and pipes.

In embodiments, the storage, grinder and dosage dispensing device can have additional bottom cups that can contain dosage amounts in a carrier selected from a member of the group comprising, but not limited to: a liquid, a powder, crystals, a gel, a baked good, a candy, a wax, an oil, and combinations thereof.

While these embodiments have been described with emphasis on the embodiments, it should be understood that within the scope of the appended claims, the embodiments might be practiced other than as specifically described herein.

What is claimed is:

1. A storage, grinder and dosage dispensing device consisting of a three part structure, the three part structure consisting of:

a. a one piece top cap body consisting of a plurality of downwardly protruding top grinding knives, wherein the one piece top cap body comprises a top cap opening configured to form an airtight seal between the one piece top cap body and a bottom cup;

b. a one piece middle section body which rotatably engages the one piece top cap body beneath the plurality of downwardly protruding top grinding knives, the one piece middle section body removably slidable against the one piece top cap body, the one piece middle section body having a height from 1 cm to 100 cm, the one piece middle section body consisting of:

(i) an upper section with a plurality of grinding teeth protruding upward and inter-engaging the downwardly protruding top grinding knives, wherein the plurality of grinding teeth have a density from 5 per square inch to 50 per square inch and a height from 10 percent to 100 percent of the height of the one piece middle section body;

(ii) a filter consisting of a plurality of holes formed adjacent the plurality of grinding teeth;

(iii) a middle section open chamber connected to the filter opposite the plurality of grinding teeth;

(iv) a volumetric measuring means configured to measure dosage amounts of ground material formed on the one piece middle section body;

(v) a label for indicating incremental daily dosage amounts of the ground material; and (vi) at least one opening formed in a side wall of the one piece middle section body providing a visual portal to view the dosage amounts for a user within the one piece middle section body, the at least one opening for dispensing the dosage amounts for the user of the ground material from the middle section open chamber; and c. the bottom cup threadably engaging the one piece top cap body to safely contain both the plurality of downwardly protruding top grinding knives and the plurality of grinding teeth simultaneously forming a child safe connection, the bottom cup consisting of: a bottom cup height from 1 cm to 100 cm and an airtight storage chamber when threadably connected to the one piece top cap body with the bottom cup; and wherein the storage, grinder and dosage dispensing device is configured to simultaneously grind and tear material inserted into the one piece top cap body by the plurality of downwardly protruding top grinding knives and the plurality of grinding teeth as the one piece top cap body is rotated on the one piece middle section body creating the ground material with diameters sufficient to pass through the plurality of holes of the one piece middle section body to the middle section open chamber and into the bottom cup.

2. The storage, grinder and dosage dispensing device of claim 1, comprising a closable port for dispersing the measured dosage amounts from the one piece middle section body.

3. The storage, grinder and dosage dispensing device of claim 1, comprising a top cap body outer diameter that fits over the one piece middle section body to the bottom cup with a bottom cup diameter forming an airtight seal.

4. The storage, grinder and dosage dispensing device of claim 1, comprising a screen in the middle section open chamber allowing particulate to pass through the screen while keeping the ground material above the screen.

5. The storage, grinder and dosage dispensing device of claim 4, comprising a tray in the one piece middle section body to catch the particulate falling through the screen.

6. The storage, grinder and dosage dispensing device of claim 1, comprising at least one clear transparent flexible film covering the at least one opening providing the visual portal to contents within the storage, grinder and dosage dispensing device.

7. The storage, grinder and dosage dispensing device for claim 1, wherein the bottom cup is configured to thread to at least one additional bottom cup for additional storage.

8. The storage, grinder and dosage dispending device of claim 1, wherein the one piece middle section body comprises a container to enable the user to access the ground material.

9. The storage, grinder and dosage dispensing device of claim 8, wherein the container can force fit with the upper section of the one piece middle section body.

10. The storage, grinder and dosage dispensing device of claim 7, further comprising outer threads on the one piece top cap body to secure the at least one additional bottom cup or a threadable accessory to the one piece top cap body.

11. The storage, grinder and dosage dispensing device of claim 10, further comprising bottom cup threads on the bottom cup to engage threads on either the at least one additional bottom cup or on the threadable accessory.

12. The storage, grinder and dosage dispensing device of claim 1, comprising a closable port in a bottom or in the side wall of the one piece middle section body allowing release of a user defined dosage amount of particulate from the middle section open chamber.

13. The storage, grinder and dosage dispensing device of claim 7, wherein the bottom cup, the at least one additional bottom cup, or both the bottom cup and the at least one additional bottom cup contain the measured dosage amounts in a carrier selected from a member of the group comprising: a liquid, a powder, crystals, a gel, a baked good, a candy, a wax, and an oil.

\* \* \* \* \*